United States Patent [19]

Brownrigg et al.

[11] Patent Number: 5,018,827
[45] Date of Patent: May 28, 1991

[54] METHOD FOR ELIMINATING THE TEMPERATURE SENSITIVITY OF AN OPTICAL FIBER AND A TEMPERATURE INSENSITIVE OPTICAL FIBER

[76] Inventors: Patrick Brownrigg, 6481 Atlantic #N242, Long Beach, Calif. 90805; Victor Vali, 26035 Moulton Pkwy., Laguma Hills, Calif. 92653; Bruce Youmans, 9532 E. Live Oak Ave., Temple City, Calif. 91780

[21] Appl. No.: 426,125

[22] Filed: Oct. 3, 1989

[51] Int. Cl.$^5$ .............................................. G02B 6/16
[52] U.S. Cl. ................................................. 350/96.30
[58] Field of Search ................. 350/96.29, 96.30, 96.33

[56] References Cited

U.S. PATENT DOCUMENTS 4,778,244 10/1988 Ryan ................................. 350/96.33
4,906,066 3/1990 Ryan ................................. 350/96.33

Primary Examiner—John D. Lee
Assistant Examiner—Stephen W. Barns

[57] ABSTRACT

An optical fiber is constructed by selecting a first material for a core of the optical fiber. The first material has a known coefficient of thermal expansion, $\alpha_1$, and a known temperature dependent rate of change, $dn/dT$, of an index of refraction, n. A second material (cladding) has a predetermined coefficient of thermal expansion, $\alpha_2$, and a radius, $R_2$, about the axis of the fiber. The radius, $R_2$, of the cladding is determined such that an effective coefficient of thermal expansion for the fiber is substantially equal to the negative of the product of the reciprocal of the index of refraction of the first material and the temperature dependent rate of change of the index of refraction of the first material, i.e. $\alpha = (-1/n)dn/dT$.

8 Claims, 1 Drawing Sheet

METHOD FOR ELIMINATING THE TEMPERATURE SENSITIVITY OF AN OPTICAL FIBER AND A TEMPERATURE INSENSITIVE OPTICAL FIBER

BACKGROUND OF THE INVENTION

This invention was made with government support. The government has certain rights in this invention.

1. Field of the Invention

The present invention relates generally to optical fibers and more particularly to a novel method for eliminating the temperature sensitivity of an optical fiber and also to a temperature insensitive optical fiber constructed in accordance with the novel method.

2. Description of Related Art

Presently known fiber optic sensors have a temperature sensitivity resulting from the temperature dependent change of optical path length in the optical fibers used to construct such sensors. The optical path length is a function of both the index of refraction of the fiber and its geometric length. The index of refraction is temperature dependent as is geometric length.

In the prior art, to compensate for temperature dependency of the fibers, active servos have been utilized. For example, one such active servo is a piezoelectric fiber stretcher which is placed in intimate contact with the optical fiber. An electrical signal is developed as a function of the ambient temperature, and this signal is applied to the piezoelectric stretcher. As is well known in the art, the piezoelectric mechanically deforms in response to an electrical signal. This mechanical deformation is coupled to the optical fiber in a predetermined relationship such that the optical path length of the optical fiber remains the same.

Such optical fiber sensors find many uses in fiber microphones, fiber hydrophones, fiber gyroscopes, fiber magnetic field sensors and fiber electric field sensors. Fiber interferomic sensors are becoming important in the industry because they are environmentally rugged and insensitive to electromagnetic interference.

At present, some instruments in automobiles are planned to be replaced with fiber sensors. Temperature gauges and fuel gauges for automobiles have the potential of being made relatively inexpensive using fiber optics. However, a significant limitation and disadvantage of the prior art, as discussed above, is that these devices are relatively expensive because of the use of the active servos used to stretch the fibers to achieve temperature insensitivity. For many applications, the added cost of piezoelectric stretchers prohibitively adds to the cost of the fiber sensors.

In phased array radars, the relative phase of the RF or microwave energy between the antenna elements can be controlled optically and ideally should be independent of temperature. Again, this temperature independence is not practically achieved within the prior art.

Fiber optic sensors can also be used for laser frequency stabilization which require the ratio of the changes in frequency to the desired frequency to be small, typically less than $10^{-14}$.

Present known fiber optic interferomic sensors measure temperature and pressure (acoustic or DC) as well as current, electric field strength and other parameters simultaneously. However, it is often difficult to separate the temperature produced effects from the other parameters one wants to measure.

SUMMARY OF THE INVENTION

Accordingly, it is a feature of the present invention to provide a method for eliminating the temperature sensitivity of an optical fiber. It is a further feature of the present invention to provide a temperature insensitive optical fiber.

According to the present invention, the novel method generally involves choosing the proper thermal expansion coefficients and temperature dependencies of the indexes of refraction to each of a fiber core and a fiber cladding of the optical fiber. The method includes selecting a first material for the core of the optical fiber, and determining a coefficient of thermal expansion, $\alpha_1$, and a temperature dependent rate of changes, dn/dT, of an index of a reflection, n, for the first material. A second material is then selected for the cladding of the optical fiber. The second material has a known coefficient of thermal expansion, $\alpha_2$, different from $\alpha_1$. A radius of the second material about the axis of the fiber is then determined such that an effective coefficient of thermal expansion, $\alpha$, of the fiber is substantially equal to the negative of the product of a reciprocal of the index of refraction of the first material and the temperature dependent rate of change of the index of refraction of the first material, i.e. $\alpha = (-1/n)dn/dT$.

The temperature insensitive optical fiber of the present invention includes a core of a first material. The first material has a predetermined coefficient of thermal expansion $\alpha_1$, and a predetermined temperature dependent rate of change, dn/dT, of an index of refraction, n. The optical fiber of the present invention further includes a cladding of a second material coaxial with and surrounding the core. The second material has a known coefficient of thermal expansion, $\alpha_2$, different from $\alpha_1$. A radius of the second material about the axis of the fiber is determined such that an effective coefficient of thermal expansion, $\alpha$, of the fiber is substantially equal to the negative of the product of a reciprocal of the index of refraction of the first material and the temperature dependent rate of change of the index of refraction of the first material, i.e. $\alpha = (-1/n)dn/dT$.

These and other objects, advantages and features of the present invention will become readily apparent to those skilled in the art from a study of the following description of an exemplary preferred embodiment of the present invention when read in conjunction with the attached drawings and appended claims.

DESCRIPTION OF AN EXEMPLARY PREFERRED EMBODIMENT

Figure 1:
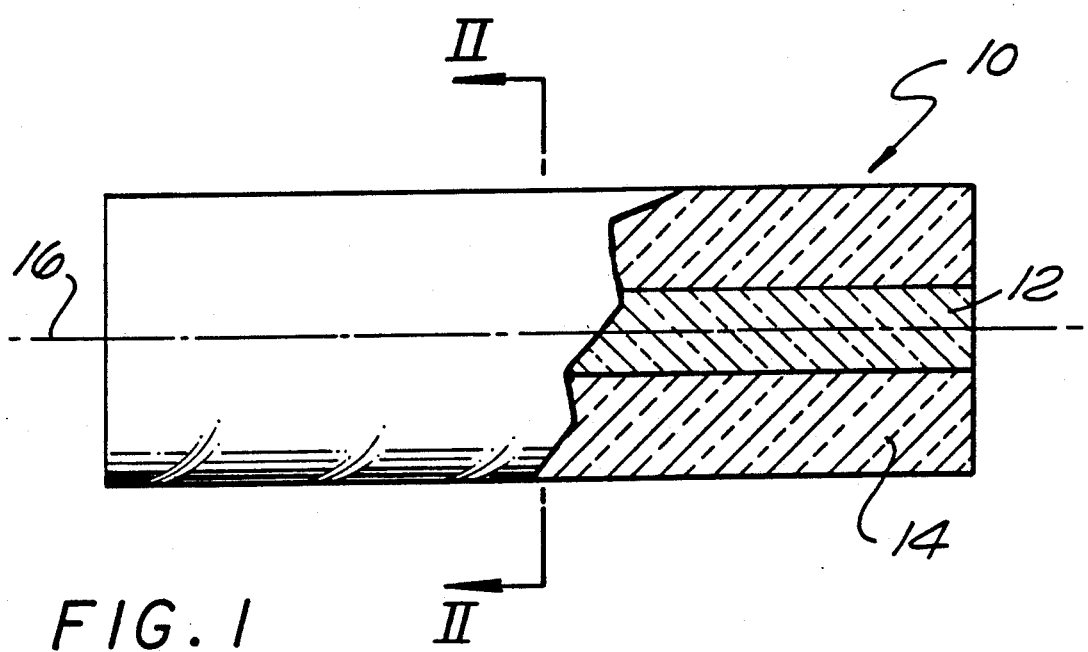
FIG. 1 is a view, partially broken and partially in cross section, of an optical fiber constructed according to the principles of the present invention.
Figure 2:
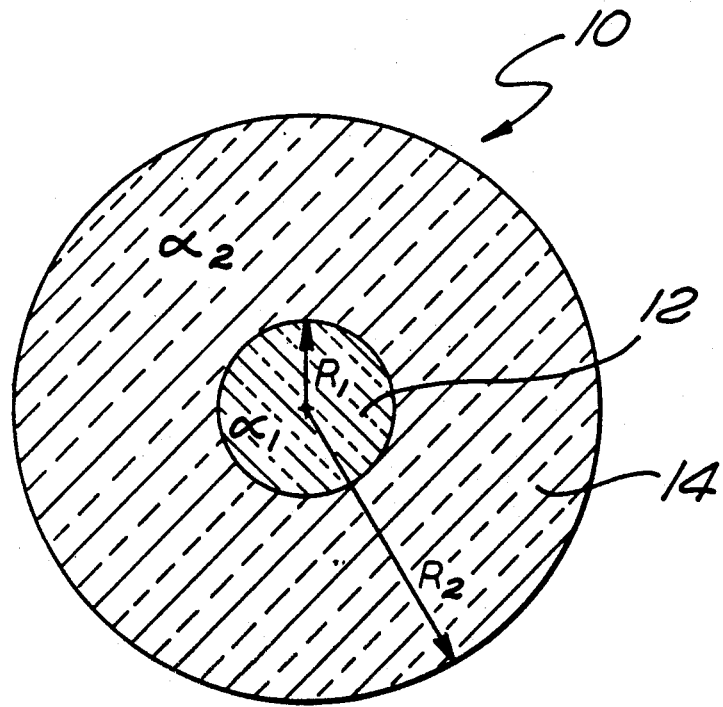
FIG. 2 is a cross-sectional view of the optical fiber taken a long line II—II of FIG. 1.

Referring now to FIGS. 1 and 2, a temperature insensitive optical fiber 10 constructed according to the principles of the present invention includes a core 12 of a first material and a cladding 14 of a second material.

The first material of the core 12 has a predetermined coefficient of thermal expansion, $\alpha_1$, a radius, $R_1$, about an axis 16 of the fiber 10 and a predetermined temperature dependent rate of change, dn/dT, of its index of refraction, n. The second material of the cladding 14 is coaxial with and surrounding the core 12. The second material has a predetermined coefficient of thermal expansion, $\alpha_2$, and a radius, $R_2$, about the axis 16. To make the fiber 10 temperature independent, according to the present invention, the radius, $R_2$, is determined such that an effective coefficient of thermal expansion, $\alpha$, of the fiber 10 is substantially equal to the negative of the product of a reciprocal of the index of refraction, n, of the first material and a temperature dependent rate of change, $dn/dT$ of the index of refraction of the first material, i.e. $\alpha = -(1/n)dn/dT$. The conditions which satisfy this relationship, wherein the relationship becomes solely dependent on the radius, $R_2$, are described in greater detail hereinbelow.

The effective coefficient of expansion, $\alpha$, of the fiber 10 is substantially equal to the coefficient of expansion, $\alpha_2$, of the second material of the cladding 14 summed with the product of a square of ratio, $(R_1R_2)^2$, between the radius, $R_1$, of the core 12 and the radius, $R_2$, of the cladding 14 with the difference between the coefficient of expansion, $\alpha_1$, of the first material and the coefficient of expansion, $\alpha_2$, of the second material, i.e. $\alpha = (R_1/R_2)^2(\alpha_1-\alpha_2)+\alpha_2$. This radius can be determined independently after the other quantities become known. If the radius, $R_2$, of the cladding 14 about the axis 16 is substantially larger than the radius, $R_1$, of the core 12, then the effective coefficient of expansion is approximately equal to the coefficient of expansion of the second material.

According to the method of the present invention, the first material is selected for the core 12 of the optical fiber 10. Its coefficient of thermal expansion, $\alpha_1$, and its temperature dependent rate of change, $dn/dT$, of its index of refraction, n, is then determined. The method of the present invention further includes selecting the second material for the cladding 14 of the optical fiber 10. The second material, according to the principles of the present invention, has a predetermined coefficient of thermal expansion, $\alpha_2$, and a radius, $R_2$, about the axis 16 of the fiber 10. The radius, $R_2$, is determined such that the above-described condition wherein an effective coefficient of thermal expansion, $\alpha$, of the fiber 10 is substantially equal to the negative of the product of a reciprocal of the index of refraction, n, of the first material and the temperature dependent rate of change, $dn/dT$, of the index of refraction of the first material, i.e. $\alpha = -(1/n)dn/dT$.

Hereinabove described are the general principles of the present invention. So that those skilled in the art may obtain a fuller appreciation of the general principles set forth above, the following is a detailed analysis of these principles.

For any optical fiber 10, its optical path length, $L_o$, is defined as the product of its index of refraction with its geometric length, $L_g$, or $$L_o = nL_g \tag{1}$$

The change of the optical path length, $L_o$, with temperature, T, may then be given by $$\Delta L_o = L_g \Delta n + n\Delta L_g, \text{ wherein}$$

$$\Delta n = (dn/dT)\Delta T, \text{ and}$$

$$\Delta L_g = (dL_g/dT)\Delta T. \tag{2}$$

By substitution of the expressions for $\Delta n$ and $\Delta L_g$, the change of optical path length, $L_o$, can then be written as $$\Delta L_o = [L_g(dn/dT) + n(dL_g/dT)]\Delta T. \tag{3}$$

From the definition of a coefficient of thermal expansion, $\alpha$, the temperature dependent rate of change of the geometric length can be written as follows:

$$dL_g/dT = \alpha L_g. \tag{4}$$

Therefore, the expression for the optical path length change, $\Delta L_o$, set forth above in equation (3), may be rewritten as $$\Delta L_o = [(dn/dT) + n\alpha]L_g\Delta T. \tag{5}$$

To make the optical path length in the fiber independent of temperature, a glass needs to be selected such that the term within the brackets of the immediately preceding equation (5) equals zero to satisfy the above-described condition, or $$dn/dT = -n\alpha \tag{6}$$

Although there are glasses with $$dn/dT = -10\times10^{-6}\cdot C^{-1}, \text{ to } 19\times10^{-6}\cdot C^{-1}, \tag{7}$$

and a coefficient of thermal expansion $\alpha$ from $$\alpha = 5\times10^{-7}, \text{ to } 13\times10^{-6}\cdot C^{-1}, \tag{8}$$

it is difficult to match $dn/dT$ and $\alpha$ for a specific glass such that the condition set forth in the above equation is satisfied.

According to the method of the present invention to eliminate the temperature sensitivity of the optical fiber 10, the temperature dependent rate of change, $dn/dT$, of the index of refraction, n, is varied independently of the parameters of the core 12 and therefore equation (6) can be satisfied in a relatively straightforward manner.

The parameters of the first material for the core 12 are the predetermined $dn/dT$ and the predetermined $\alpha_1$. The cladding 14 is selected to have an $\alpha_2$ different from $\alpha_1$ as is known in the construction of optical fibers. The effective coefficient of thermal expansion, $\alpha$, of the fiber 10 is a combination of the coefficients of thermal expansion, $\alpha_1$ and $\alpha_2$, core 12 and the cladding 14, respectively, and may be expressed as $$\alpha = (\alpha_1 A_1 + \alpha_2 A_2)/(A_1+A_2). \tag{9}$$

$A_1$ and $A_2$ are the cross-sectional areas for the core 12 and cladding 14, respectively, having thermal expansion coefficients $\alpha_1$ and $\alpha_2$. Rewriting equation (9) in terms of radii $R_1$ and $R_2$ gives $$\alpha = (R_1/R_2)^2(\alpha_1-\alpha_2)+\alpha_2. \tag{10}$$

After substituting the expression for $\alpha$ given by equation (10) into equation (6), one skilled in the art would recognize that $\alpha_1$ and $dn/dT$ are the known properties of the core 12 and that the radius, $R_1$, is also known.

Once the quantity dn/dT is determined, the expansion coefficient $\alpha_2$ of the cladding 14 can be selected independently of the parameters of the core 12. Therefore according to the principles of the present invention, the condition of equation (6) can be satisfied by determining the thickness or radius, $R_2$, of the cladding 14, the radius, $R_2$, being the only remaining variable in equations (6) and (10).

The determining of the radius, $R_2$, of the cladding 14, so that the conditions described hereinabove are satisfied, may usually be done during the manufacture of the fiber preforms and the radius, $R_2$, may be selected to a small fraction of a percent accuracy. For small core fibers, i.e., single mode fibers, the ratio $(R_1/R_2)^2$ is much less than 1 and therefore the effective coefficient of thermal expansion $\alpha$ is approximately equal to $\alpha_2$.

There has been described above a novel method and apparatus according to the principles of the present invention. Those skilled in the art may now make numerous uses of and modifications to the present invention without departing from the inventive concepts disclosed herein. For example, one skilled in the art can choose a three-layered fiber in which case a third term is added to the numerator and denominator of the above equation. Accordingly, the present invention is to be solely by the scope of the appended claims.

What is claimed is:

1. A method for substantially eliminating the temperature sensitivity of an optical fiber comprising:
   selecting a first material for a core of said optical fiber;
   determining a coefficient of thermal expansion, $\alpha_1$, and a temperature dependent rate of change, dn/dT, of an index of refraction, n, for said first material; and
   selecting a second material for a cladding of said optical fiber, said second material having a predetermined coefficient of thermal expansion, $\alpha_2$, and a radius, $R_2$, about an axis of said fiber, said radius being determined such that an effective coefficient of thermal expansion, $\alpha$, of said fiber is substantially equal to the negative of the product of a reciprocal of said index of refraction of said first material and said temperature dependent rate of change of said index of refraction of said first material, i.e. $\alpha=(-1/n)dn/dT$.

2. A method as set forth in claim 1 wherein said effective coefficient of expansion of said fiber is substantially equal to said coefficient of expansion of said second material summed with the product of a square of a ratio between a radius of said core and said radius of said cladding and a difference between said coefficient of expansion of said first material and said coefficient of expansion of said second material, i.e. $\alpha=(R_1/R_2)^2(\alpha_1-\alpha_2)+\alpha_2$.

3. A method as set forth in claim 1 wherein said radius of said cladding about said axis is substantially larger than a radius of said core wherein said effective coefficient of expansion is approximately equal to said coefficient of expansion of said second material.

4. A temperature insensitive optical fiber comprising:
   a core of a first material, said first material having a predetermined coefficient of thermal expansion, $\alpha$, and a predetermined temperature dependent rate of change, dn/dT, of an index of refraction, n; and
   a cladding of a second material coaxial with and surrounding said core, said second material having a predetermined coefficient of thermal expansion, $\alpha_2$, and a radius, $R_2$, about an axis of said fiber, said radius being determined such that an effective coefficient of thermal expansion, $\alpha$, of said fiber is substantially equal to the negative of the product of a reciprocal of said index of refraction of said first material and said temperature dependent rate of change of said index of refraction of said first material, i.e. $\alpha=(-1/n)dn/dT$.

5. An optical fiber as set forth in claim 4 wherein said effective coefficient of expansion of said fiber is substantially equal to said coefficient of expansion of said second material summed with the product of a square of a ratio between a radius of said core and said radius of said cladding and a difference between said coefficient of expansion of said first material and said coefficient of expansion of said second material, i.e. $\alpha=(R_1R_2)^2(\alpha_1-\alpha_2)+\alpha_2$.

6. An optical fiber as set forth in claim 4 wherein said radius of said cladding about said axis is substantially larger than a radius of said core such that said effective coefficient of expansion is approximately equal to said coefficient of expansion of said second material.

7. A method for substantially eliminating the temperature sensitivity of an optical fiber comprising:
   selecting a first material for a core of said optical fiber having a radius, $R_1$, about an axis of said fiber;
   determining a coefficient of thermal expansion, $\alpha_1$, and a temperature dependent rate of change, dn/dT, of an index of refraction, n, for said first material; and
   selecting a second material for a cladding of said optical fiber, said second material having a predetermined coefficient of thermal expansion, $\alpha_2$; and
   determining a radius, $R_2$, of said second material about said axis such that a condition $$dn/dT = -\alpha n$$

is satisfied wherein $\alpha=(R_1/R_2)^2(\alpha_1-\alpha_2)+\alpha_2$.

8. A temperature insensitive optical fiber comprising:
   a core of a first material, said first material having a predetermined coefficient of expansion, $\alpha_1$, a temperature dependent rate of change, dn/dT, of an index of refraction, n, and a radius, $R_1$, about an axis of said fiber; and
   a cladding of a second material coaxial with and surrounding said core, said second material having a predetermined coefficient of thermal expansion, $\alpha_2$, and a radius, $R_2$, about said axis, said radius, $R_2$, of said second material being determined such that a condition $$dn/dT = -\alpha n$$

is satisfied wherein $$\alpha=(R_1/R_2)^2(\alpha_1-\alpha_2)+\alpha_2.$$

* * * * *